United States Patent [19]

Barnes et al.

[11] 3,939,009

[45] Feb. 17, 1976

[54] METHOD OF MAKING BATTERY PLATE GRIDS FOR LEAD-ACID BATTERIES AND ALLOYS THEREFOR

[75] Inventors: Stanley Charles Barnes, Coventry; Robert James Lawrie, Solihull, both of England

[73] Assignee: Joseph Lucas (Batteries) Limited, Birmingham, England

[22] Filed: Mar. 22, 1974

[21] Appl. No.: 453,976

[30] Foreign Application Priority Data

Apr. 7, 1973 United Kingdom............... 16809/73

[52] U.S. Cl. ...................... 136/66; 75/167; 136/65
[51] Int. Cl.² ..................... H01M 4/84; C22C 11/02
[58] Field of Search ................... 75/167; 136/65, 66

[56] References Cited
UNITED STATES PATENTS

| | | | |
|---|---|---|---|
| 1,745,721 | 2/1930 | Shoemaker | 75/167 |
| 1,791,148 | 2/1931 | Shoemaker | 75/167 |
| 3,647,545 | 3/1972 | Mao | 75/167 |

*Primary Examiner*—R. Dean
*Attorney, Agent, or Firm*—Holman & Stern

[57] ABSTRACT

Battery plate grids for lead-acid batteries are manufactured from an alloy having the following composition in atomic percentages:-

| | |
|---|---|
| Calcium + Lithium | 0.22 – 1.04 |
| Aluminium | 0.035 – 0.25 |
| Lead | remainder, | wherein the atomic percentage of lithium in the alloy is not less than 0.15 and does not exceeds 0.90 and the atomic percentage of calcium in the alloy is not less than 0.07 and does not exceed 0.49.

7 Claims, No Drawings

METHOD OF MAKING BATTERY PLATE GRIDS FOR LEAD-ACID BATTERIES AND ALLOYS THEREFOR

This invention relates to battery plate grids for lead-acid batteries.

Conventionally, battery plate grids for lead-acid batteries are cast from lead alloyed with a small amount of antimony to increase the strength of the grid. The use of antimony for this purpose is, however, disadvantageous since antimony produces undesirable side reaction in the battery and also is expensive. To overcome the disadvantages of using antimony, it has been suggested to cast grids from alloys of lead and calcium and of lead and lithium, but these alloys have in general proved unsatifactory for the production of grids since the casting operation must take place in a protective atmosphere, such as forming gas. It has, however, now been found that grids can be cast from lead alloyed with small amounts of calcium, lithium and aluminium without the use of a protective atmosphere during the casting operation.

Accordingly, in one aspect, the invention resides in an alloy for use in the manufacture of battery plate grids for lead-acid batteries, wherein the alloy has the following composition in atomic percentages:

| | |
|---|---|
| Calcium + Lithium | 0.22 – 1.04 |
| Aluminium | 0.035 – 0.25 |
| Lead | remainder, and | wherein the atomic percentage of lithium is not less than 0.15 and does not exceed 0.90, and the atomic percentage of calcium is not less than 0.07 and does not exceed 0.49.

Preferably, the composition of the alloy in atomic percentages is:

| | |
|---|---|
| Calcium + Lithium | 0.25 – 0.65 |
| Aluminium | 0.035 – 0.25 |
| Lead | remainder, | wherein the atomic percentage of lithium in the alloy does not exceed 0.58 and the atomic percentage of calcium in the alloy is not less than 0.07.

More preferably, the composition of the alloy in atomic percentages is:

| | |
|---|---|
| Calcium + Lithium | 0.30 – 0.50 |
| Aluminium | 0.035 – 0.25 |
| Lead | remainder, | wherein the atomic percentage of lithium in the alloy does not exceed 0.43 and the atomic percentage of calcium in the alloy is not less than 0.07.

Most preferably, the composition of the alloy in atomic percentages is:

| | |
|---|---|
| Calcium + Lithium | 0.35 – 0.50 |
| Aluminium | 0.11 |
| Lead | remainder, | wherein the atomic percentage of lithium in the alloy does not exceed 0.39 and the atomic percentage of calcium in the alloy is not less than 0.07.

In a further aspect, the invention resides in a method of manufacturing a battery plate grid for a lead-acid battery comprising the steps of producing an alloy of lead, calcium, lithium and aluminium as described in the preceding paragraphs and casting the alloy into the shape of a grid.

Referably, the casting operation is carried out in air.

In a first example of the invention, to manufacture a battery plate grid for a lead-acid battery an alloy of lead with lithium is initially prepared, the alloy containing 23.17 atomic percent of lithium. The alloy is produced by melting lead in a crucible at a temperature of 350°C and in an atmosphere or argon and then introducing lithium metal into the molten lead, a perforated crucible situated within the body of the molten lead serving to retain the lithium below the surface of the lead until alloying has occurred.

A further quantity of lead is then alloyed with 9.54 atomic percent of calcium. This alloy is produced by melting lead in a crucible at a temperature of 650°C and in an atmosphere of forming gas and then introducing calcium hydride and lithium hydride into the molten lead, a perforated crucible situated within the body of the molten lead serving to retain the hydrides below the surface of the lead. At the temperature of the molten lead, the hydrides decompose to produce gaseous hydrogen and metallic calcium and lithium, the latter reacting with the lead to form the required lead/calcium/lithium alloy. The gaseous hydrogen produced by the decomposition of the hydrides bubbles through the melt to atmosphere and thereby serves to agitate the melt and to help prevent oxidation of the lead/calcium/lithium alloy.

Yet a further quantity of lead is then alloyed with 1.52 atomic percent of aluminium by melting the lead in atmosphere of forming gas at 700°C and then introducing aluminium into the molten lead. An appropriate quantity of this molten lead/aluminium alloy is then mixed with molten lead and to this mixture is added a predetermined amount of the above lead/calcium alloy in solid form so as to produce a lead/calcium/aluminium alloy. To this alloy is then added a predetermined amount of the above lead/lithium alloy in solid form so as to produce a lead/calcium/lithium/aluminium alloy containing 0.20 atomic percent calcium, 0.30 atomic percent lithium and 0.11 atomic percent aluminium, the remainder being lead.

The final molten alloy is then cast into battery plate grids in air at 550°C. The casting operation is conveniently performed using a grid casting machine sold by T.B.S. Engineering Limited of Cheltenham, which is a type of machine normally employed for casting 6% antimonial lead grids. The machine is provided with water cooling for the grid mould or chill so as to ensure that the grid-defining face of the mould remains at a substantially uniform temperature in the range 150° – 250°C, and preferably at 175°C. Also, the mould is coated with a thermal barrier layer, such as cork, having a controlled thickness of about 0.005 inch so to ensure that the molten grid material cools at a controlled rate. With this arrangement it is possible to cast satisfactory grids having an over all thickness of between 0.055 and 0.110'', a convenient casting rate being 17 grids per minute.

In a second example, the procedure of the first example is repeated, but the relative proportions of the components used to produce the final lead/calcium/lithium/aluminium alloy are such that the latter contains 0.1 atomic percent calcium, 0.2 atomic percent lithium and 0.14 atomic percent aluminium, the remainder being lead. Again, satisfactory grids can be cast from such an alloy.

In a third example, the same procedure is repeated but with the arrangement being such that the final lead/calcium/lithium/aluminium alloy consists of 0.07 atomic percent calcium, 0.90 atomic percent lithium and 0.22 atomic percent aluminium, the remainder being lead.

In a fourth example, a similar procedure is again adopted, but now the proportions of the constituents are such that the final alloy contains 0.07 atomic percent calcium, 0.90 atomic percent lithium and 0.035 atomic percent aluminium, the remainder being lead.

In a fifth example, the procedure of the first example is again repeated, but now the relative proportions of the constituents are such that the final alloy consists of 0.49 atomic percent calcium, 0.15 atomic percent lithium and 0.07 atomic percent aluminium, the remainder being lead.

It is found that the alloys of the above examples can be readily cast into battery plate grids. Moreover, it is found that grids produced from these alloys exhibit low creep in service and show insignificant interdendritic corrosion in use. However, it may be necessary, before using grids from these alloys, to allow the grids to stand for a period so that they age harden.

Although in the examples described above the final quaternary alloy has been produced by adding a lead/lithium alloy to a molten lead/calcium/aluminium alloy, it is to be appreciated that, as an alternative, lithium metal could have been added to the molten lead/calcium/aluminium alloy to produce the required quaternary alloy.

We claim:

1. An alloy for use in the manufacture of battery plate grids for lead-acid batteries, wherein the alloy consists of:

| | |
|---|---|
| Calcium + Lithium | 0.22 –1.04 Atomic % |
| Aluminium | 0.035–0.25 Atomic% and |
| Lead | Remainder, | and wherein the atomic percentage of lithium is not less than 0.15 and does not exceed 0.90, and the atomic percentage of calcium is not less than 0.07 and does not exceed 0.49.

2. An alloy for use in the manufacture of battery plate grids for lead-acid batteries, wherein the alloy consists of:

| | |
|---|---|
| Calcium + Lithium | 0.25 –0.65 Atomic % |
| Aluminium | 0.035–0.25 Atomic % and |
| Lead | Remainder, | and wherein the atomic percentage of lithium in the alloy is not less than 0.18 and does not exceed 0.58 and the atomic percentage of calcium in the alloy is not less than 0.07.

3. An alloy for use in the manufacture of battery plate grids for lead-acid batteries wherein the alloy consists of:

| | |
|---|---|
| Calcium + Lithium | 0.30 –0.50 Atomic %, |
| Aluminium | 0.035–0.25 Atomic % and |
| Lead | Remainder | and wherein the atomic percentage of Lithium in the alloy is not less than 0.23 and does not exceed 0.43 and the atomic percentage of Calcium in the alloy is not less than 0.07.

4. An alloy for use in the manufacture of battery plate grids for lead-acid batteries, wherein the alloy consists of:

| | |
|---|---|
| Calcium + Lithium | 0.35–0.50 Atomic % |
| Aluminium | 0.11 Atomic % and |
| Lead | Remainder, | and wherein the atomic percentage of Lithium in the alloy is not less than 0.28 and does not exceed 0.39 and the atomic percentage of Calcium in the alloy is not less than 0.07.

5. A method of manufacturing a battery plate grid for a lead-acid battery comprising the steps of producing a molten alloy consisting of:

| | |
|---|---|
| Calcium + Lithium | 0.22 –1.04 Atomic % |
| Aluminium | 0.035–0.25 Atomic % and |
| Lead | Remainder | and wherein the atomic percentage of Lithium is not less than 0.15 and does not exceed 0.90 and the atomic percentage of Calcium is not less than 0.07 and does not exceed 0.49, and then casting the molten alloy into the shape of the grid.

6. A method as claimed in claim 5 wherein the casting operation is carried out in air.

7. A method as claimed in claim 5 wherein the alloy is cast in a mould to produce the required grid and the region of the mould presented to the alloy is maintained at a temperature between 150°C and 250°C.

* * * * *